United States Patent Office 2,995,542
Patented Aug. 8, 1961

2,995,542
FLUOROCARBON ACRYLIC-TYPE AMIDES AND POLYMERS
Harvey A. Brown, St. Paul, Minn., assignor to Minnesota Mining and Manufacturing Company, St. Paul, Minn., a corporation of Delaware
No Drawing. Filed May 20, 1957, Ser. No. 660,047
14 Claims. (Cl. 260—79.3)

This invention relates to novel and useful fluorocarbon acrylic-type amides and to their polymers and more particularly to fluorocarbonsulfonyl acrylamides and methacrylamides and to their polymers.

It is an object of the present invention to provide compositions of matter capable of being easily polymerized to produce useful homo- and copolymers.

It is also an object of the present invention to provide fluorinated polymers which have utility as surface active agents and as surface treating agents. Additional objects will be apparent to those skilled in the art from the specification which follows.

The acrylic type amides of the invention can be represented by the formula:

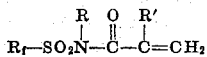

wherein $R_f$ is a saturated fluorocarbon structure containing from 4 to 18 fully fluorinated carbon atoms, R is hydrogen or an alkyl group containing from 1 to 6 carbon atoms and R' is hydrogen or a methyl group.

The complete perfluorocarbon structure or group can be a perfluoroalkyl group having an open (acyclic) straight- or branched-chain, or a cyclic structure (e.g. a perfluorocyclohexyl group having a six-membered ring structure) or it can consist of a combination of perfluoroalkyl straight chain and perfluoro cyclic groups. The prefluorocarbon group may be bonded to sulfur atom of the molecule through either a cyclic or an acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure, as is shown, for instance, in U.S. Patents Nos. 2,500,388 and 2,616,927.

Thus, the compounds of the invention are characterized by a completely fluorinated "tail" group ($R_f$), by an unsaturated functional group capable of undergoing free radical initiated addition polymerization whereby polymers containing the unit:

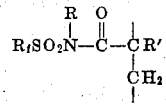

may be formed, and by a bridge between these groups which renders the polymers stable under a wide variety of conditions.

The stable and inert terminal perfluorocarbon "tail" is non-polar and is repellent not only to water but also to oils and hydrocarbons. It imparts unique surface-active surface treatment properties not possessed by corresponding compounds having a hydrocarbon tail, the latter being oleophilic and highly soluble in oils and hydrocarbons. The invention provides surface treating agents that coat the substrate so as to form a fluorocarbon-type surface that is not only water repellent but is repellent to oils and greases.

It is of critical importance that the perfluorocarbon "tail" contain at least four carbon atoms, and the preferred number is six to ten. A terminal fluorocarbon chain of this minimum length is required in order to insolubilize and render both hydrophobic and oleophobic the perfluoroalkanesulfonamido end of the molecule. Increasing the length of this "tail" decreases solubility still further and enhances the degree of water and oil repellency imparted to polymers of the present compounds.

Fluorocarbonsulfonamide compounds useful as starting materials for making the present compounds can be readily prepared from corresponding perfluoroalkanesulfonyl fluorides, as described in U.S. Patent 2,732,398 and the application of H. A. Brown, Ser. No. 556,047, filed December 29, 1955, now U.S. Patent No. 2,809,990.

Among the fluorocarbonsulfonyl acrylamides and methacrylamides included within the scope of the invention are: N-methyl, N-perfluorobutanesulfonyl acrylamide; N-methyl, N-perfluorobutanesulfonyl methacrylamide; N-perfluoro(2-methylcyclohexane)sulfonyl methacrylamide; N-methyl, N-perfluoro(4-methylcyclohexane)sulfonyl acrylamide; N-propyl, N-perfluoro(2-methylcyclohexane)sulfonyl methacrylamide; N-perfluorooctanesulfonyl acrylamide; N-perfluorooctanesulfonyl methacrylamide; N-ethyl, N-perfluorooctanesulfonyl acrylamide; N-isobutyl, N-perfluoro(4-ethylcyclohexane)sulfonyl acrylamide; N-isobutyl, N-perfluorodecanesulfonyl methacrylamide; N-propyl, N-perfluorododecanesulfonyl acrylamide; N-(n-hexyl), N-perfluorooctadecanesulfonyl acrylamide and N-(n-hexyl), N-perfluoro(4-decylcyclohexane)methacrylamide.

The polymers of the present compounds can be prepared using well known bulk, solution and emulsion techniques employing such free radical initiators as benzoyl peroxide, dicumyl peroxide and the like. The homopolymers of the present compounds are colorless, water repellent and oil repellent thermoplastic solids. They are insoluble in hydrocarbons and in non-polar organic solvents and are highly insoluble in water. They are, however, soluble in fluorinated solvents such as fluorocarbon acids and esters, benzotrifluoride and xylenehexafluoride.

Coatings of the polymers can be applied from solution or emulsion to provide firmly bonded surface coatings or sizings on cloth, paper, leather, glass and ceramic articles, lithic materials and metals. Owing to orientation of the polymer molecules, the fluorocarbon "tails" provide an inert fluorocarbon-like outer surface which is both hydrophobic and oleophobic. Drops of water and drops of oil deposited on the surface will remain or run off rather than spreading and wetting the surface. In treating fibrous materials such as cloth and paper the sizing need only be sufficient to provide an extremely thin coating on the fibers which does not appreciably effect the "hand," appearance, flexibility, strength, or porosity of the material. The sized cloth or paper is rendered resistant to absorption and staining by oily or greasy materials as well as being rendered repellent to oil.

In addition to homopolymers and copolymers made exclusively from the aforesaid fluorocarbon acrylic-type amide monomers, novel copolymers (heteropolymers) may be made by interpolymerizing them with polymerizable monomers of other kinds which contain an ethylenic linkage. Examples of the latter are, maleic anhydride, acrylonitrile, vinyl chloride, vinyl acetate, vinyl silicones, styrene, methyl acrylate, methyl methacrylate, ethylene and isoprene, both as to non-halogenated and halogenated varieties. This makes possible the production of many types of polymers having different physical properties, wherein the polymer molecules include fluorocarbon units providing fluorocarbon side chain "tails" of the type mentioned above.

The properties of the polymer masses can also be varied by the use of plasticizers and by compounding with carbon black and other finely divided solid materials such as zinc oxide. The stiffness or hardness of the polymer mass can be increased by including a small proportion of a polyfunctional compound at the time of polymerization to cause crosslinking between the skeletal chains and thereby form a three dimensional network. The use of various expedients for modifying the properties of polymer masses is well understood by those skilled in polymer chemistry.

The present compounds may be prepared from corresponding fluorocarbon sulfonamides, or from the sodium salts of these sulfonamides. The preparation may thus be accomplished by preparing the sulfonamide and reacting it with acrylyl chloride or methacrylyl chloride or by reacting the sodium salt of the sulfonamide with the acrylyl chloride or methacrylyl chloride.

In order more clearly to disclose the nature of the present invention, the following examples illustrating specific products and compositions in accordance with the invention will be described. It should be understood however, that this is done solely by way of example and is intended neither to delineate the scope of the invention nor to limit the ambit of the appended claims.

EXAMPLE 1

*Preparation of N-methyl, N-perfluorobutanesulfonyl acrylamide*

A mixture of 62.6 grams (0.2 mole) of N-methyl perfluorobutane-sulfonamide (prepared by reaction of perfluorobutanesulfonyl fluoride and an excess of methyl amine in ether solution, followed by washing with aqueous hydrochloric acid and evaporation of the ether) and 20.2 grams (0.2 mole) of triethylamine dissolved in 150 milliliters of dry ether is slowly added to 20.2 grams (0.2 mole) of acrylyl chloride dissolved in 100 milliliters of ether. Almost immediately a dense, white, crystalline precipitate of triethylamine hydrochloride forms. After stirring the reaction mixture for about one hour, it is filtered and the precipitate of amine salt is washed with ether. The combined ether filtrate and washings are evaporated to dryness on a steam bath and 67.1 grams of crude liquid product are obtained. Distillation of the material under reduced pressure results in 55.4 grams of a fraction (boiling point 45–59° C./0.30 mm. of mercury, $n_D^{25}$ 1.3770) which is identified as the desired product, N-methyl, N-perfluorobutane-sulfonyl acrylamide.

Analysis shows 3.80% nitrogen (3.82% calc.) and 46.9% fluorine (46.6% calc.). The infrared spectral absorption analysis is consistent with this structure.

EXAMPLE 2

*Preparation of N-methyl, N-perfluorobutanesulfonyl methacrylamide*

The same procedure is employed as in Example 1, but utilizing methacrylyl chloride in place of acrylyl chloride. The distilled product, which is identified as N-methyl, N-perfluorobutanesulfonyl methacrylamide, boils at 52–62° C./0.5 mm. of mercury.

Analysis shows 3.68% of nitrogen (3.67% calc.) and 45.1% of fluorine (44.86% calc.). The infrared spectral absorption analysis is consistent with this structure.

EXAMPLE 3

*Preparation of N-perfluorooctanesulfonyl acrylamide*

Twenty grams (0.04 mole) of perfluorooctane-sulfonamide and 4.0 grams (0.04 mole) of triethylamine are dissolved in 30 milliliters of ether and a solution of 3.6 grams (0.04 mole) of acrylyl chloride in 10 milliliters of ether is aded slowly. After stirring for 2 hours at 30° C. the triethylamine hydrochloride is removed from the reaction mixture by filtration. The filtrate is evaporated to dryness leaving 21.8 grams of crude N-perfluorooctanesulfonyl acrylamide. A sample of this material recrystallized from toluene melts at 100–118° C. Analysis shows 2.63% of nitrogen (2.62% calc.). The infrared spectral absorption analysis is consistent with this structure.

EXAMPLE 4

This example provides a description of the preparation of N-n-propyl perfluorooctanesulfonyl acrylamide, represented by the formula:

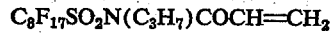

$$C_8F_{17}SO_2N(C_3H_7)COCH=CH_2$$

and certain other amides coming within the scope of the invention; and is preceded by a description of the general procedure for preparation on a substantial scale of sulfonamides derived from perfluoroalkanesulfonyl fluorides, $R_fSO_2F$, as exemplified by N-n-propyl perfluorooctane sulfonamide. The compounds in the former group may be purified by washing twice with pyridine, followed by a dilute hydrochloric acid wash and a water wash, drying over magnesium sulfate, treating with decolorizing activated carbon, and filtering.

A vessel equipped with a thermometer, stirrer and distilling head, is successively charged with about 7.2 kg. of isopropyl ether, 1.6 kg. (27 moles) of n-propylamine, and then with 4.54 kg. (9.05 moles) of the purified perfluorooctanesulfonyl fluoride starting compound, which is added over a period of 1½ hours with constant stirring while maintaining the temperature at about 25–30° C. The reaction mixture is stirred for about 3 hours at 30° C. and for about 2 hours at 40° C. After cooling to room temperature, the mixture is washed with about 5 liters of 9% aqueous hydrochloric acid solution. The phases separate upon standing and the lower (aqueous) layer is removed and discarded. The product layer is rewashed with about 5 liters of an aqueous solution containing 4.5% hydrochloric acid and 4% ferrous sulfate, and the aqueous phase again is removed and discarded. The reaction vessel is then fitted with a distilling head, and the ether is removed by distillation under reduced pressure at a water bath temperature of about 70–80° C., yielding about 4.7 kg. of N-n-propyl perfluorooctanesulfonamide having the formula:

$$C_8F_{17}SO_2NH\text{—}n\text{—}C_3H_7$$

By further reacting a 0.04 mole portion of N-n-propyl perfluorooctylsulfonamide with 0.04 mole of acrylyl chloride, in ether solution and in the presence of triethylamine according to the procedure of Example 3, there is produced N-n-propyl perfluorooctanesulfonyl acrylamide.

Analogously, when perfluorododecylsulfonyl fluoride, perfluorooctadecylsulfonyl fluoride and perfluoro(4-methylcyclohexyl)sulfonyl fluoride are employed in equivalent amounts in carrying out the foregoing procedures, there are obtained, respectively, the corresponding N-n-propyl perfluorododecanesulfonyl acrylamide represented by the formula:

$$C_{12}F_{25}SO_2N(C_3H_7)COCH=CH_2$$

N-n-propyl perfluorooctadecanesulfonyl acrylamide represented by the formula:

$$C_{18}F_{37}SO_2N(C_3H_7)COCH=CH_2$$

and N-n-propyl perfluoro(4-methylcyclohexane)sulfonyl acrylamide represented by the formula:

$$4\text{—}CF_3C_6F_{10}SO_2N(C_3H_7)COCH=CH_2$$

Similarly, by substituting n-butylamine for n-propylamine in the preparation of the N-alkyl-substituted perfluorooctanesulfonamide set forth above, there is obtained as a corresponding product N-n-butyl perfluorooctylsulfonamide, which, when treated with acrylyl chloride by the foregoing procedure, yields N-n-butyl perfluorooctanesulfonyl acrylamide.

EXAMPLE 5

*Preparation of N-methyl, N-perfluorooctanesulfonyl acrylamide*

The sodium salt of N-methyl perfluorooctanesulfonamide is prepared by adding 4.6 grams (0.2 mole) of sodium metal to 100 grams of the sulfonamide dissolved in 250 milliliters of methanol. After all of the sodium is consumed, the methanol is removed under vacuum and the sodium salt is dried by distilling two—100 milliliter portions of benzene from the salt, and heating the salt under vacuum on a steam bath. 30 milliliters of acrylyl chloride and 150 milliliters of benzene are then added and the mixture is heated on a steam bath for ½ hour. After cooling, the mixture is filtered and the solid precipitate is washed with ether. Some additional precipitate which forms in the filtrate is filtered off. The combined filtrates are evaporated to dryness and 70 grams of a waxy solid, which melts at 52–54° C., is obtained. This product is identified as N-methyl, N-perfluorooctanesulfonyl acrylamide. Analysis shows 2.42% nitrogen (2.47% calc.) and 56.7% fluorine (56.95 calc.). The infrared spectral absorption analysis is consistent with this structure.

EXAMPLE 6

*Preparation of N-ethyl, N-perfluorooctanesulfonyl acrylamide*

The same general procedure is employed as in Example 5 except that N-ethyl perfluorooctanesulfonamide is used in place of N-methyl perfluorooctanesulfonamide as the starting material. The product (N-ethyl, N-perfluorooctanesulfonyl acrylamide) boils at 80–86° C./0.5 mm. of mercury, M.P. 38–40° C. Analysis shows 2.39% nitrogen (calc. 2.41%) and 55.4% fluorine (55.5% calc.). The infrared spectral absorption analysis is consistent with this structure.

EXAMPLE 7

*Bulk polymerization of N-methyl, N-perfluorooctanesulfonyl acrylamide*

This monomer is bulk homopolymerized by charging a heavy walled "Pyrex" glass ampoule with 8 grams of monomer and 0.04 gram of acetyl peroxide (catalyst), freezing the contents of the ampoule by placing it in liquid air, evacuating the ampoule to a pressure of less than 0.01 millimeter of mercury, and then thawing, refreezing, reevacuating and finally sealing the ampoule. The sealed ampoule is then warmed until the monomer melts, at which time it is placed in an end over end rotator which is immersed in a water bath maintained at 60° C. and agitated for a period of 15 minutes. The ampoule is then opened, the contents are dissolved in xylenehexafluoride and the solution is poured into a large excess of methanol to precipitate the polymer. The precipitated polymer is washed with acetone and dried at room temperature under vacuum. A yield of 41% of theoretical is realized. This polymeric product is a transparent brittle plastic which softens at about 65° C., becomes rubbery at about 80° C. and begins to decompose at about 160° C. Its inherent viscosity is 0.22, as determined from solution in xylenehexafluoride.

In order to illustrate the utility of this polymer of N-methyl, N-perfluorooctanesulfonyl acrylamide as a cloth size (which imparts both water repellency and resistance to absorption and staining by oily and greasy materials), the following tests are presented.

Samples of a fabric which is a blend of 55% "Dacron" fibers and 45% worsted (wool) fibers were used. "Dacron" is the trademark of Du Pont de Nemours & Company of Wilmington, Delaware, for drawn polyester fibers produced from a polyester of ethylene glycol and terephthalic acid.

Samples of this cloth are dipped into a 1% by weight solution of the N-methyl, N-perfluorooctanesulfonyl acrylamide polymer in xylenehexafluoride solvent and passed through a squeeze roll to remove excess saturant. The samples are then dried in an oven for ten minutes at 150° C. Drops of water and drops of oil placed on the surface of the treated cloth remain indefinitely without spreading out and wetting the surface. The high degree of water repellency of this treated cloth was measured by a "Spray Test" (Standard Test Method Number 22–52 published in the 1952 Technical Manual and Yearbook of the American Association of Textile Chemists and Colorists, volume XXVIII, page 136), in which it rated 100 ( the highest possible rating) in this test.

The oil repellency of the treated cloth was measured by a severe test in which its resistance to penetration by solutions of mineral oil in heptane was determined. (The higher the proportion of heptane the quicker the penetration.) In the case of the above-mentioned treated cloth, resistance to penetration for at least three minutes was obtained with a mineral oil solution containing 50% (by volume) of heptane, which demonstrates excellent resistance to oil.

Although water and oil base stains (e.g. from ink, soft drinks, coffee, salad oil, foods, hair oil, etc.) can be removed from this, and other fabrics treated in the same manner, by blotting and rubbing, without leaving a mark, yet the treatment does not adversely effect the hand, shade, strength or porosity of the fabric.

The insolubility of the polymers in water, hydrocarbons, and common organic solvents renders the cloth sizing highly resistant to removal when subjected to such materials and permits of laundering and of dry cleaning the sized fabrics without destroying the effectiveness of the sizing.

Fabrics can also be sized with the polymer in the form of an aqueous latex dispersion thereby avoiding the use of solvent vehicles.

EXAMPLE 8

*Emulsion polymerization of N-ethyl, N-perfluorooctanesulfonyl acrylamide*

A heavywalled "Pyrex" glass ampoule is charged with 2 grams (100 parts) of monomer, 2.16 grams (108 parts) of water, 1.44 grams (72 parts) of methanol, 0.10 gram (5 parts) of the potassium salt of a fluorinated carboxylic acid emulsifier and 0.01 gram (0.5 part) of potassium persulfate. The charged ampoule is then frozen in liquid air, evacuated to a pressure of less than 0.01 millimeter of mercury, thawed and refrozen, reevacuated and finally sealed. The ampoule is then agitated in a 50° C. water bath for 1½ hours, at the end of which time about 85% conversion to latex polymer is obtained.

The polymer recovered from this latex is a transparent brittle plastic which softens at about 60° C., and becomes rubbery at about 70° C.

A portion of this latex is diluted with water to 1% polymer solids and is used to treat samples of the 55% "Dacron," 45% wool fabric of the previous example according to the general procedure of that example. A "Spray Rating" of 100 is obtained by testing this treated cloth. In addition it is found to resist penetration of a mineral oil solution containing 30% (by volume) of heptane for at least 3 minutes, which demonstrates excellent resistance to oil staining.

The terms and expressions which have been employed are used as terms of description and not of limitation, and it is not intended, in the use of such terms and expressions, of excluding any equivalents of the features shown and described or portions thereof, but it is recognized that various modifications are possible within the scope of the invention claimed.

What is claimed is:

1. Perfluorocarbon acrylamides represented by the formula:

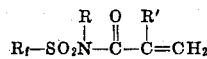

wherein $R_f$ is a perfluorocarbon group containing 4 to 18 carbon atoms, R is a member of the group consisting of hydrogen and alkyl radicals containing 1 to 6 carbon atoms, and R' is a member of the group consisting of hydrogen and the methyl radical.

2. N-methyl,N-perfluorobutanesulfonyl acrylamide having the formula

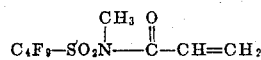

3. N-methyl,N-perfluorobutanesulfonylmethacrylamide having the formula

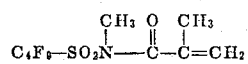

4. N-perfluoroctanesulfonyl acrylamide having the formula

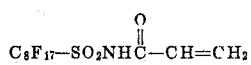

5. N-methyl,N-perfluoroctanesulfonyl acrylamide having the formula

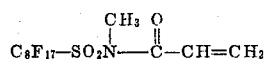

6. N-ethyl,N-perfluoroctanesulfonyl acrylamide having the formula

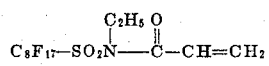

7. Polymers having a skeletal chain consisting essentially of repeating units represented by the formula:

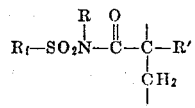

wherein $R_f$ is a perfluorocarbon group containing 4 to 18 carbon atoms, R is a member of the group consisting of hydrogen and alkyl radicals containing 1 to 6 carbon atoms and R' is a member of the group consisting of hydrogen and the methyl radical.

8. Polymers having a skeletal chain consisting essentially of repeating units derived from N-methyl, N-perfluorooctanesulfonyl acrylamide and represented by the formula:

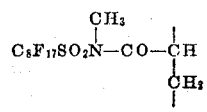

9. Copolymers of perfluorocarbon acrylamides of the formula:

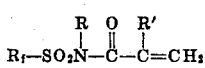

wherein $R_f$ is a perfluorocarbon group containing 4 to 18 carbon atoms, R is a member of the group consisting of hydrogen and alkyl radicals containing 1 to 6 carbon atoms, and R' is a member of the group consisting of hydrogen and the methyl radical, and monomers which contain an ethylenic linkage.

10. Polymers of a compound of the formula:

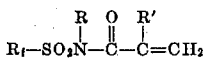

wherein $R_f$ is a perfluorocarbon group containing 4 to 18 carbon atoms, R is a member of the group consisting of hydrogen and alkyl radicals containing 1 to 6 carbon atoms, and R' is a member of the group consisting of hydrogen and the methyl radical.

11. Polymers of a compound of the formula:

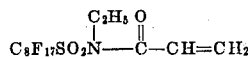

12. As an article of manufacture, a fibrous material of the class consisting of cloth and paper, the surface of which is coated with a polymer of a compound of the formula:

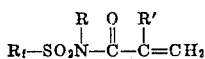

wherein $R_f$ is a perfluorocarbon group containing 4 to 18 carbon atoms, R is a member of the group consisting of hydrogen and alkyl radicals containing 1 to 6 carbon atoms, and R' is a member of the group consisting of hydrogen and the methyl radical.

13. As an article of manufacture, paper sized with a polymer of a compound of the formula:

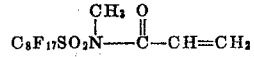

14. Cloth sized with a polymer of a compound of the formula:

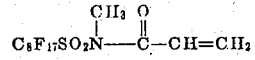

References Cited in the file of this patent

UNITED STATES PATENTS

| | | |
|---|---|---|
| 2,732,398 | Brice et al. | Jan. 24, 1956 |
| 2,803,615 | Ahlbrecht et al. | Aug. 20, 1957 |
| 2,803,656 | Ahlbrecht et al. | Aug. 20, 1957 |
| 2,852,554 | England | Sept. 16, 1958 |